United States Patent Office 3,681,055
Patented Aug. 1, 1972

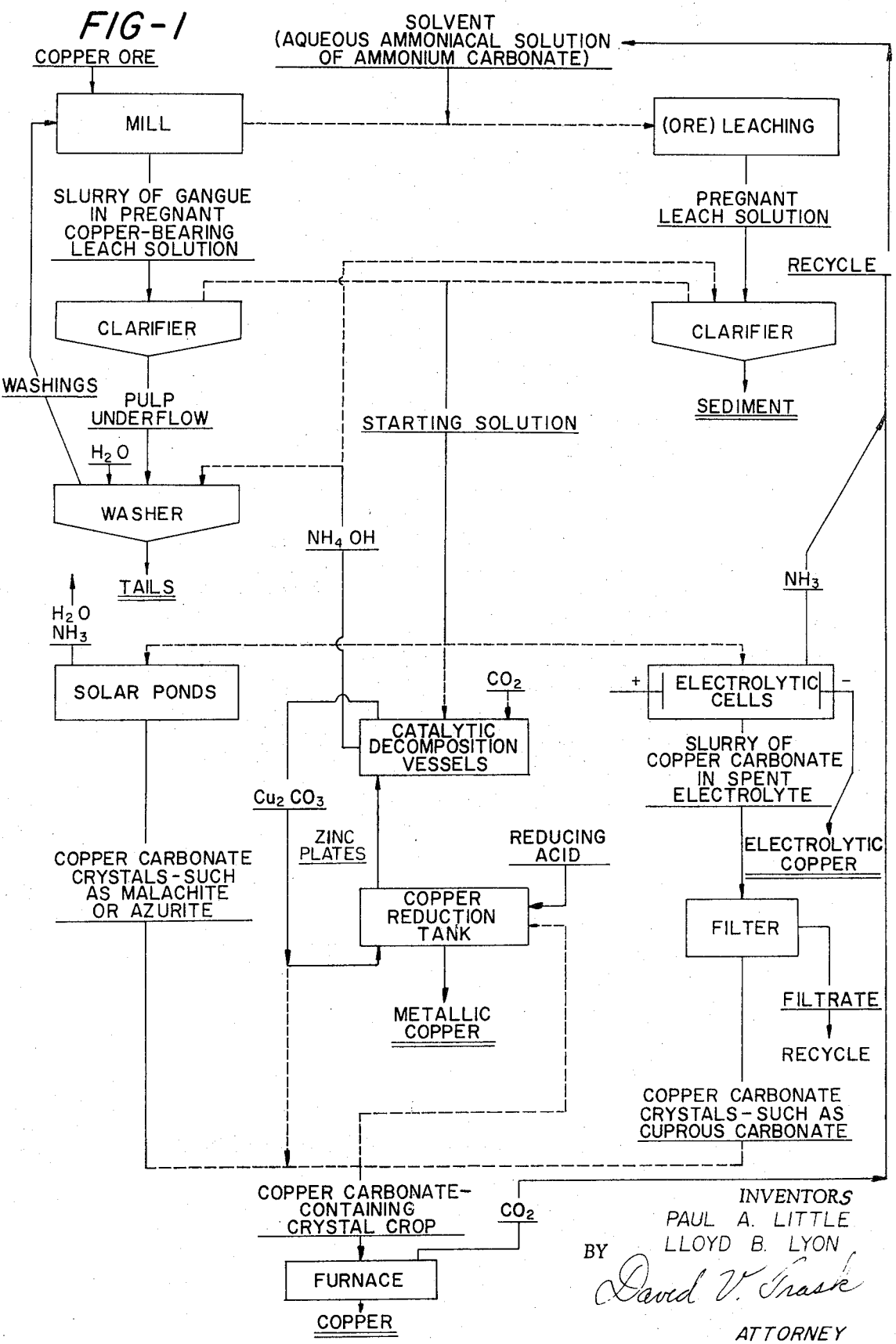

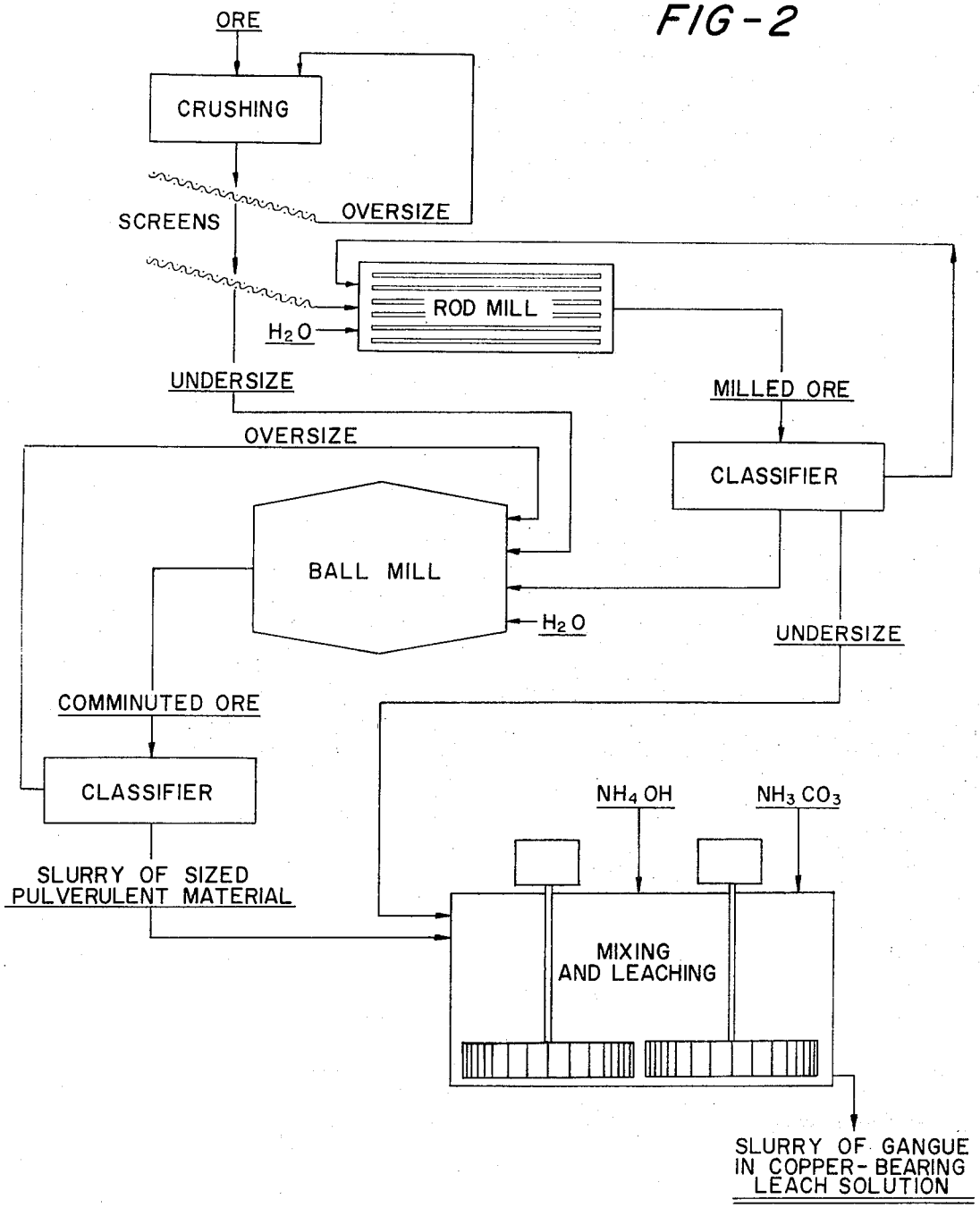

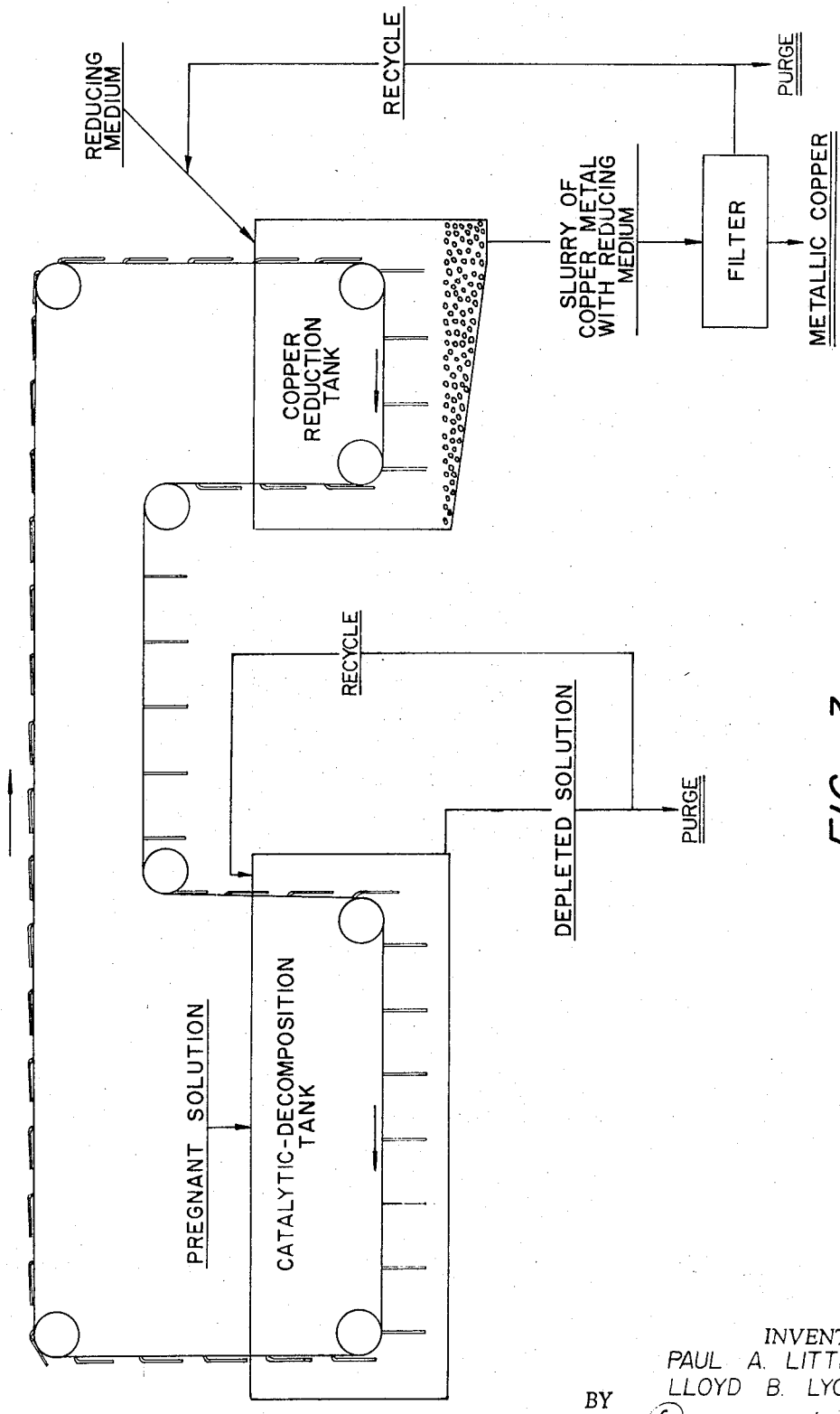

3,681,055
COPPER RECOVERY PROCESS
Paul A. Little and Lloyd B. Lyon, Salt Lake City, Utah, assignors to American Refining Limited, Salt Lake City, Utah
Filed Apr. 21, 1969, Ser. No. 817,660
Int. Cl. C22b *15/12*
U.S. Cl. 75—108      14 Claims

ABSTRACT OF THE DISCLOSURE

Copper values are extracted from low-grade materials with an ammoniacal aqueous solution of ammonium carbonate to produce an aqueous solution of copper ammonium carbonate complex. The solution is treated by electrolysis, evaporation, or metal catalysis to decompose the copper ammonium complex and produce a copper carbonate precipitate. The copper carbonate precipitate is recovered and reduced to metallic copper.

BACKGROUND OF THE INVENTION

Field

This invention relates to the winning of metal values from metal-bearing materials. It is specifically directed to the recovery of metallic copper from leach solutions prepared by extracting copper wtih ammoniacal aqueous solutions of ammonium carbonate. It is applicable to the recovery by other metals, notably silver, mercury, and nickel.

State of the art

It is known to extract metal values from certain ores by contacting the ore materials with ammoniacal solutions of ammonium carbonate. Such leaching has been practiced commercially to recover nickel from low-grade nickel sulfide and nickel oxide ores. So far as is known, no such process has been commercially successful for the recovery of copper values. According to the literature, nickel extracted by such leach solutions forms the nickel polyamine complex: $Ni(NH_3)_6^{++}$. It is suggested in the literature that the corresponding copper polyamine complex would be $Cu(NH_3)_6^{++}$.

Naturally occurring copper carbonate has been smelted commercially. Heretofore, however, it has not been suggested that copper carbonate be chemically produced as an intermediate in the production of copper metal. Present day milling procedures are designed to concentrate copper minerals in their naturally occurring state. Commercial copper leaching operations involve the recovery of metallic copper from leach solutions by displacement techniques (typically, metallic iron is displaced by dissolved copper to produce cement copper) or by electrowinning techniques (a current is applied across an electrolytic cell filled wtih leach solution to produce copper anodes at the cathode of the cell).

Apparently, there is no pertinent literature concerning extracting such metals as mercury, silver, gold, platinum and palladium with ammonium carbonate leach solutions.

SUMMARY OF THE INVENTION

The present invention involves the novel procedure of treating leach solutions of copper in aqueous ammoniacal ammonium carbonate solvent to produce a copper carbonate precipitate. The copper carbonate precipitate is then recovered and reduced by chemical or smelting techniques to metallic copper. The starting solution, which is thought to contain copper in the form of a copper ammonium carbonate complex, may be obtained in any convenient way. An overall commercial process of this invention will usually include more or less conventional leaching or milling techniques, adapted to produce such a solution. Thus, copper-bearing material may be intimately contacted with an aqueous ammoniacal solution of ammonium carbonate to extract copper values. The resulting solution is treated in any appropriate fashion to cause the precipitation of copper carbonate, as either a single or complex salt. The precipitate may contain copper as either cuprous carbonate or cupric carbonate.

The precise composition of the ammoniacal solution of ammonium carbonate employed to extract copper values from ore material is not critical to the practice of the present invention. Usually, ammonium carbonate will be included in amounts approaching its solubility limit in the aqueous medium at the temperatures at which it will be used. Less concentrated solutions may often be used to advantage. Typical solutions will contain about 8 to about 12 percent by weight of ammonium carbonate, based on the weight of the water solvent, and will have a pH in the range of about 8 to about 10, due at least partially to the presence of a stoichiometric excess of ammonia (the solution will contain more than two moles of ammonia per mole of carbonate). The term "ammonia" is used in its broadest sense to include $NH_3$ and its reaction products in aqueous solution, such as $NH_4OH$ or the amine moieties of such complexes as $Cu(NH_3)_6^{++}$.

A notable feature of the present invention is that ammonium carbonate solutions of the aforedescribed type may be employed to extract copper values from such difficult materials as the copper oxide-silicate ores. Such ores are generally found in admixture with limestone. In any event, the compositions of the formations in which such ores are generally found make extraction by acid-leaching techniques commercially impractical. Ammonium carbonate extractants have been found quite effective in extracting copper values from such ores, either by conventional leaching techniques or by milling procedures involving the comminution of the ore material and the intimate mixing of the comminuted material with the extractant to produce a pregnant solution.

Although the presence of a copper ammonium complex in the pregnant leach solution may be deduced, its precise form is not known. It is presumably either the polyamine complex: $Cu(NH_3)_6^{++}$ suggested by the literature or some other complex containing copper and ammonia (or decomposition products of ammonia) with or without other constituents. In any event, the pregnant leach solutions produced by the aforedescribed leaching or extraction techniques are characterized in that upon evaporation or electrolysis they first become saturated with respect to $NH_4OH$ and then evolve free $NH_3$ while precipitating a copper carbonate-containing crystal crop.

The copper carbonate-containing crystal crops produced by various embodiments of this invention differ in chemical composition, but in all events, contain either cuprous carbonate or cupric carbonate. Cupric carbonate usually precipitates as a complex salt, such as malachite, $$(CuCO_3 \cdot Cu(OH)_2)$$

or azurite $(2CuCO_3 \cdot Cu(OH)_2)$. The composition of the copper carbonate-containing precipitate is determined by the method used to effect its decomposition. The precipitate will, however, usually contain only minor amounts (less than about ½ percent by weight) of metals other than copper. Any of the copper carbonate-containing precipitates obtained by the practice of this invention may be reduced by simple chemical or smelting expedients to produce metallic copper.

The aforedescribed copper ammonium carbonate solutions may be treated by any convenient means to remove ammonia from solution. Apparently, these treatments result in the decomposition of copper ammonium carbonate complexes in solution. In any event, a copper carbonate-containing precipitate is formed. A number of alternative procedures are available, and the particular approach selected in a specific instance will depend primarily on economic conditions and considerations.

The pregnant solution may be subjected to evaporation to concentrate the solution with respect to copper carbonate and to volatilize $NH_3$. Evaporation may be conducted in a closed system and the volatilized ammonia recovered for recycle. Such procedures, though technically feasible, are generally not economic; in arid climates, with favorable evaporation rates, solar evaporation is economically advantageous. Thus, the pregnant solution may be pumped into large ponds and subjected to solar evaporation. A copper carbonate-containing crystal crop, usually comprised of malachite, azurite, or admixtures thereof, is deposited on the floor of the pond and may be recovered by conventional harvesting equipment. The crystal crop may then be smelted or otherwise reduced to produce metallic copper.

An alternative procedure for obtaining a copper carbonate-containing precipitate is to subject the pregnant solution to electrolysis; thereby forming electrolytic copper on the cathode, evolving $NH_3$ gas at the anode, and forming a cuprous carbonate precipitate at the bottom of the cell. The cuprous carbonate precipitate may be recovered and subjected to reduction by smelting or chemical techniques to produce metallic copper.

Certain metals, notably zinc, apparently catalyze the decomposition of copper ammonium carbonate complexes in the pregnant solution to produce a cuprous carbonate precipitate. Thus, when zinc plates are immersed in a pool of pregnant leach solution, a deposit of copper carbonate is formed on the surface thereof. The plates may then be removed from the pregnant solution and immersed in a reducing solution, such as a dilute hydrochloric acid solution. The copper carbonate is then reduced to metallic copper, leaving a thin copper oxide film on the zinc plate. The oxide-coated zinc plate may be reimmersed in the pregnant solution to accumulate a second deposit of copper carbonate. A cyclical process may be established whereby zinc plates are alternately immersed in the pregnant leach solution and then in the reduction tank. A similar process relies upon other metals having oxidation potentials in excess of about 0.5 volt (notably iron or stainless steel plates) to catalyze the formation of the copper carbonate precipitate. When ferrous metals are relied upon as the catalyst, copper carbonate precipitates from solution but does not adhere to the catalyst; thus, it must be separated from the leach solution by some other means, such as filtering. The effectiveness of metals other than zinc as the catalyst is enhanced by the application of an electric current to the solution, utilizing the catalytic metal as the anode. Metallic copper may then be simultaneously deposited on the cathode.

DESCRIPTION OF THE DRAWINGS

In the drawings, which illustrate what is presently regarded as the best mode for carrying out the invention:

FIG. 1 is a combined flow sheet illustrating several alternative embodiments of the invention;

FIG. 2, a typical milling procedure for producing pregnant copper ammonium carbonate solutions; and FIG. 3, a schematic diagram of a continuous recovery embodiment of the invention.

DESCRIPTION OF THE ILLUSTRATED EMBODIMENTS

As illustrated by the drawings, a pregnant leach solution containing copper ammonium carbonate complex is produced by conventional leaching techniques or by a milling procedure such as that specifically illustrated by FIG. 2.

Referring to FIG. 2, ore is comminuted in conventional fashion by crushers, rod mills, and ball mills to a pulverulent material, typically sized between about −10 and about +200 mesh. The properly-sized material is introduced as an aqueous slurry, together with ammonia and ammonium carbonate, to a mixing and leaching operation to produce a slurry of gangue in pregnant, copper-bearing leach solution. Pregnant solutions from dump, heap or vat leaching operations may also be treated (FIG.1). The mill slurry (or leach solution) may be clarified and washed as illustrated by FIG. 1 to produce the starting solution for processing according to this invention.

The starting solution may be forwarded to solar ponds, electrolytic cells, or decomposition vessels as illustrated by FIG. 1 and as previously described. Treatment of the solution by these alternative methods to produce copper carbonate-containing crystal crops is illustrated by the following specific examples:

EXAMPLE I

A clarified, pregnant leach solution containing about 1 to about 5 percent by weight copper, having a pH of about 9, is introduced to a solar evaporation pond. The solution is prepared by contacting a copper oxide-silicate ore assaying about 0.9 percent by weight copper and containing negligible amounts of other metals below hydrogen in the electromotive force series of elements with an aqueous ammoniacal solution of ammonium carbonate. The pond is of earthen construction and is stabilized with asphaltic compositions to prevent leakage and to provide sufficient strength for the operation of harvesting equipment on the pond floor. During the evaporation season, a solution depth of about 6 inches is maintained in the pond. The concentration of copper carbonate in the solution increases sufficiently over the course of the evaporation season that a substantial crystal crop, predominating in copper carbonate, is deposited on the pond floor. At the close of the evaporation season, the pond is drained, and the crystal crop is harvested. Typical crystal crops produced in this fashion assay between about 40 and about 55 percent by weight copper.

EXAMPLE II

Pregnant leach solution similar to that of Example I is introduced to an electrolytic cell with stainless steel anodes and thin copper starting sheets as cathodes. The cell is operated with a current density of between about 5 to about 30 amperes per square foot at the cathodes and about 20 to about 100 amperes per square foot at the anodes. A potential difference of about 6 volts is maintained across the cell. Electrolytic copper is produced on the cathodes and a slurry of cuprous carbonate in spent electrolyte is recovered from the cell. The cuprous carbonate crystal crop is separated by filtration from the electrolyte, and the electrolyte is recycled to the solution-preparation step.

EXAMPLE III

A leach solution similar to that of Examples I and II is introduced to a copper-recovery system, such as that illustrated by FIG. 3. Thus, the solution is introduced to a first (catalytic decomposition) tank depleted solution being withdrawn from the bottom thereof. A portion of the depleted solution is purged from the system while the remainder is recycled to the tank. An endless belt, carrying zinc plates, circulates through the catalytic decomposition tank and a second (copper-reduction) tank. The solution within the catalytic decomposition tank soon becomes saturated with respect to ammonium hydroxide and thereafter free ammonia is evolved.

A 3.6 percent by weight aqueous solution of hydrochloric acid is maintained in the copper-reduction tank. A slurry of copper metal is withdrawn from the copper-reduction tank, copper metal is separated by filtration, and the filtrate is recycle to the tank.

Copper carbonate which fails to adhere to catalytic plates in the process described by Example II, as well as copper carbonate precipitate from either solar ponds or electrolytic cells, may be chemically reduced by slurrying it with reducing agents, notably reducing acids, such as the mineral acids: HCl, $H_2SO_3$, or $H_2S$; and the carboxylic acids: acetic, formic, or citric acids. Alternatively, any of the copper carbonate precipitates of this invention may be smelted by conventional techniques.

The catalytic decomposition of Example III may be repeated substituting metals, such as aluminum, iron, or chromium for zinc. Generally, any metal with an oxidation potential in excess of about 0.5 volt may be used as a catalyst, although zinc is uniquely advantageous because of its ability to catalyze the restoration of hydrogen to the ammonia molecule.

Reference herein to details of specific embodiments is not intended to limit the scope of the appended claims which themselves recite those features regarded as essential to the invention. It has been found, for example, that metal values may be readily extracted from oxide, silicate, and sulfide minerals containing any of the metals: copper, nickel, mercury, silver, platinum, gold, and palladium, using ammoniacal solutions of ammonium carbonate. The resulting solutions may be treated by the procedures taught by this disclosure to produce metal-bearing crystal crops comparable to the copper carbonate crystal crops of the examples. Some metals, such as nickel, may form nickel oxide precipitates rather than carbonates, but such precipitates may be smelted or economically reduced in the same fashion as the copper carbonates. The procedures of this invention are particularly suitable for separating the aforementioned metals from iron and magnesium in the ore materials.

A particularly advantageous application of this invention involves the treatment of common rocks to recover precious and other valuable metals, notably nickel, platinum, palladium gold, and silver. Ammonium carbonate leach solutions, such as those disclosed hereinbefore, will selectively extract such metals from iron and magnesium rocks, whether such rocks are predominantly oxides, silicates or sulfides. Although it has long been recognized that such rocks contain precious metals (and other valuable metals), no commercially feasible method has been available for recovering these values. Leach solutions prepared by contacting such rocks with the ammonium carbonate extractants of this invention may be treated by any of the expendients disclosed herein to recover the valuable metal values. The presently preferred recovery procedure is to plate the metal values onto zinc strips, with or without the application of electric current.

Many common rocks can be crushed and classified to recover a heavy fraction. This fraction usually predominates in iron and contains most of the valuable metals. Such a fraction, when it predominates in magnetite, is commonly referred to as "black sand." Black sand may often be concentrated from weathered rocks formed by mineralization of pyrrhotites or other sulfides, but are more often concentrated from the granites, diorites, garneirites, peridotites, serpentines, diopsides, or other common silicate rocks by conventional techniques, notably tabling.

It has been found advantageous to take additional steps to solubilize the precious metals in the concentrate (e.g., black sands) or rock. For example, the material may be roasted before it is leached. Preferably, a complexing agent such as cyanide, humic acid, ground mushrooms, or other polysaccharide material, is included in the ammoniacal ammonium carbonate extractant, particularly when it is desired to extract gold or platinum.

We claim:

1. A method for recovering copper values from pregnant solutions containing copper dissolved in aqueous ammoniacal ammonium carbonate solvent, which comprises:

treating such a pregnant solution to cause the formation of a copper carbonate-containing precipitate from said solution;
recovering said copper carbonate containing precipitate from said solution; and
treating said copper carbonate-containing precipitate to reduce it to metallic copper.

2. A method according to claim 2, wherein said solution is treated to volatilize ammonia thereby to form a crystal crop of copper carbonate-containing salts.

3. A method according to claim 2, wherein said crystal crop is smelted to reduce it to metallic copper.

4. A method according to claim 3, wherein said solution is evaporated to volatilize ammonia, thereby to produce a crystal crop of cupric carbonate-containing salts.

5. A method according to claim 4, wherein said evaporation is by solar evaporation.

6. A method according to claim 4, wherein said cupric carbonate-containing salts comprise the species: azurite and/or malachite.

7. A method according to claim 3, wherein said solution is exposed to electrolysis in a cell to produce metallic copper at the cathode and to produce ammonia at the anode thereby to form a cuprous carbonate-containing precipitate.

8. A method according to claim 2, wherein:
said solution is contacted with a catalytic metal capable of promoting the displacement of $NH_3$ from a copper ammonium carbonate complex, thereby forming a copper carbonate precipitate on the surface of said metal;
said copper carbonate precipitate is removed from said solution; and
said copper carbonate precipitate is contacted with a reducing agent in aqueous solution to reduce and precipitate to metallic copper.

9. A method according to claim 8, wherein the said metal is selected from the group consisting of those having an oxidation potential above about 0.5 volt.

10. A method according to claim 8, wherein the reducing agent is selected from the group consisting of reducing mineral acids and reducing carboxylic acids.

11. A method according to claim 10, wherein the metal is zinc so that the precipitate adheres to the surface of said metal and the precipitate is removed from said solution and contacted with said reducing agent while it is adhering to said zinc metal surface.

12. A method according to claim 11, wherein:
the said solution is introduced to a first vessel;
a second vessel contains said reducing agent in an aqueous medium;
a zinc metal surface is first immersed in said solution in said first vessel for sufficient duration to collect a copper carbonate precipitate on its surface and is then withdrawn from said first vessel and immersed, with said precipitate on its surface, into the aqueous reducing medium in said second vessel for sufficient duration for said precipitate to be substantially removed from its surface; and
said zinc surface is thereafter continuously cycled through said first and second vessels to alternately collect said precipitate in said first vessel and deliver said precipitate to said second vessel.

13. A method according to claim 12, wherein the zinc surface comprises a continuous belt arrangement such that each portion of said surface moves progressively and alternately through said first and second vessels.

14. A method according to claim 12, wherein said precipitate comprises cuprous carbonate so that contact of said precipitate by said reducing agent leaves a residual deposit of copper oxide on said zinc metal surface while effecting the removal of most of said precipitate.

(References on following page)

References Cited

UNITED STATES PATENTS

| | | | |
|---|---|---|---|
| 585,355 | 6/1897 | Burghardt et al. | 204—106 |
| 755,302 | 3/1904 | Le Sueur | 75—117 |
| 883,961 | 4/1908 | Jumau | 204—106 |
| 1,204,843 | 11/1916 | Bretherton et al. | 75—103 X |
| 1,608,844 | 11/1926 | Edwards et al. | 75—103 |
| 3,492,115 | 1/1970 | Mahalla | 75—103 |

OTHER REFERENCES

Mellor: Comprehensive Treatise on Inorganic and Theoretical Chemistry, vol. 3, Longmans, Green and Co., N.Y., 1932, pp. 270 and 271.

GEORGE T. OZAKI, Primary Examiner

U.S. Cl. X.R.

75—109, 103, 117; 23—61, 305; 204—87, 106

UNITED STATES PATENT OFFICE
CERTIFICATE OF CORRECTION

Patent No. 3,681,055  Dated August 1, 1972

Inventor(s) Paul A. Little and Lloyd B. Lyon

It is certified that error appears in the above-identified patent and that said Letters Patent are hereby corrected as shown below:

Col. 4, line 75, change "II" to --III---;

Claim 2, line 1, change "2" to --1--;

Claim 8, line 10, change "and" to --said--.

Signed and sealed this 9th day of January 1973.

(SEAL)
Attest:

EDWARD M. FLETCHER, JR.  ROBERT GOTTSCHALK
Attesting Officer  Commissioner of Patents